Patented June 21, 1932

1,864,073

UNITED STATES PATENT OFFICE

KAMILL KOHN, OF BOKAU, AND THEODOR GRUSCHKA, OF AUSSIG, CZECHOSLOVAKIA

PRODUCTION OF BACTERICIDE SURFACES

No Drawing. Application filed March 17, 1928, Serial No. 262,594, and in Czechoslovakia February 25, 1928.

Most of the morbific bacteria lose their vitality if remaining for a long time outside the human body or an artificial substrate; light and the absence of a liquid medium make them, in time, incapable of living. However, their resistance against these influences is so strong that a communication of the disease is easily possible and for this reason various disinfecting methods have been introduced into practice. The ideal way of disinfection would be to treat all things serving for the daily use in such a way that any bacteria touching their surface should be killed almost instantaneously, but so that, on the other hand, the availability of these things should not be reduced nor any other qualities introduced which are harmful or even disagreeable.

We have solved this problem for a series of daily necessities made of one of the most important materials—paper. Paper is not only used as packing material for all kinds of goods, especially foodstuffs, but it also circulates in the shape of money, which is known to be one of the most dangerous transmitters of morbific bacteria. Naturally, the paper prepared for the purpose described above must not change its colour, appearance, or mechanic resistance, nor must it assume any specific smell. The ingredient used for impregnation must produce sufficient activity even in the smallest quantities and must be insoluble in water, alcohol and other liquors generally used; likewise it must be insoluble or nearly insoluble in fats and grease.

We discovered that the best ingredients for this purpose are mercury salts of fatty acids which cover all requirements. Paper containing 0,005 g. of stearate of mercury for every 4 square diameter of surface kills bacteria touching it very quickly.

The bactericide quality of metals is called "oligodynamic" influence. This quality has in the past been observed and (consequently only seldom) made use of through application of the pure metal itself. By discovering compounds of the metals which are apt for easy application and yet maintain all oligodynamic qualities possessed by the metal (e. g. mercury, gold, silver, copper) we have solved the problem of ideal bactericide surfacing. The compounds of oligodynamic metals mentioned above are insoluble in water and alcohol, nearly insoluble in fats and oils, have no colour (e. g. stearate of mercury) nor odour of their own and the melting point (130° centigrade for stearate of mercury) is so high that it still enables the imbuing of paper according to known methods but lies above any temperature possible during the practical application or use of the paper, even in tropic countries.

We made sure that not only the oligodynamic influence of the compounds themselves, but also that of paper covered with an imperceptible layer of these ingredients is extremely strong and covers all practical requirements. Such paper may be used for all purposes, mainly for bank notes.

Having described our invention, what we claim and desire to secure by Letters Patent is as follows:

The treatment of surfaces subjected to contact by bacteria carriers, by the production on said surface in each case of a bactericide layer comprising mercury stearate.

In testimony whereof we affix our signatures.

DR. KAMILL KOHN.
DR. THEODOR GRUSCHKA.